United States Patent [19]
Kamil

[11] Patent Number: 4,706,275
[45] Date of Patent: Nov. 10, 1987

[54] TELEPHONE SYSTEM

[75] Inventor: Zvi Kamil, Ramat Gan, Israel

[73] Assignee: Aerotel Ltd., Ramat Gan, Ill.X

[21] Appl. No.: 797,658

[22] Filed: Nov. 13, 1985

[51] Int. Cl.[4] ............................................ H04M 17/02
[52] U.S. Cl. .................................... 379/144; 379/154;
                                                                    379/155
[58] Field of Search ........... 179/6.3 R, 6.3 CC, 2 CA,
            179/7.1 R, 7.1 TP, 8 A; 379/143, 144, 154, 155,
                                                                         146

[56]                 References Cited
            U.S. PATENT DOCUMENTS
    3,652,795  3/1972  Wolf et al. ........................ 179/2 CA
    3,676,597  7/1972  Peterson ............................ 179/6.3 R
    3,938,091  2/1976  Atalla et al. ...................... 179/6.3 R
    4,439,636  3/1984  Newkirk et al. .................. 179/7.1 R
    4,595,983  6/1986  Gehalo et al. .................... 179/6.3 R FOREIGN PATENT DOCUMENTS
    2575016  6/1986  France ................................ 379/144

*Primary Examiner*—James L. Dwyer
*Attorney, Agent, or Firm*—Sandler & Greenblum

[57]                      ABSTRACT

A telephone system enabling prepayment for telephone calls, wherein special code and credit information is stored in memory in special exchanges and debited as the call progresses.

23 Claims, 4 Drawing Figures

TELEPHONE SYSTEM

FIELD OF THE INVENTION

This invention is concerned with telephone systems and more particularly with telephone systems wherein when a prepayment is in force the prepaid party can use any telephone for completing telephone calls including toll calls. The telephone system includes public phones dedicated to use by prepaid parties.

BACKGROUND OF THE INVENTION

Telephones are generally available almost everywhere. Most telephones are private and any telephone calls are charged to the telephone on a monthly or bimonthly basis. It is not always possible or convenient to determine the time and charges for a single telephone call as it is made. Accordingly the use of somebody else's phone is many times awkward.

Further, toll or long distance telephone calls are used more and more as people travel more and conduct business on a less localized basis. Presently long distance calls can be made by charging the call to a local telephone such as for example to a telephone in a hotel room. The long distance call can be made by instant payment such as for example when using a public payphone. The long distance call can be made by charging the call to the calling party's home or business telephone or by using a telephone company credit card number. The long distance call can also be made as a "collect call" where the called party has to accept the call and is then billed the time and charges for the call.

Each of these present day methods for making and paying for toll calls has significant detriments. For example when a call is charged to hotel room telephones the hotel adds its charges to the call thereby disproportionately increasing the cost of the call.

It is extremely difficult to make long distance calls from public payphones since it requires large amounts of the coins—not ordinarily carried about—especially when touring or on a business trip.

The use of credit card calls often result in mistaken charges billed to the telephone credit card number. Further to obtain a telephone credit requires credit checks and the establishment of credit often almost impossible to acquire.

Salesmen similarly should be able to call their home offices from a customer's telephone without having the call charged to the customer's telephone which is inconvenient or to their home office phone with the previously mentioned difficulties and the added cost.

Thus there is a long felt need for a system which enables making telephone calls including local or toll calls conveniently, inexpensively and from any telephone. Thus if a party wants to make a call, be it a local call or a long distance national or international call, he should be able to accomplish the call from the nearest available telephone.

BRIEF DESCRIPTION OF THE INVENTION

According to a broad aspect of the invention, a telephone system is provided for enabling prepayment of telephone calls, said system comprising:

means for coupling a calling party's station to a special central office for certifying said calling party responsive to a certified code transmitted from the calling party's station to the special central office when said calling party has a credit on a prepayment, and means for enabling the connection of said calling party station to desired called party station responsive to said certification.

According to a feature of the invention means are provided in the special central station for further increasing the cost effectiveness of the system by selectively routing the call over the least expensive available lines.

A further feature of the invention provides for dedicated public paystations connected to the special central stations thereby enabling the use of the paystations to connect to called party telephone stations without the use of coins but instead by using said certifiable code.

According to another broad aspect of the present invention, a method enabling the coinless use of dedicated public telephones is provided, said method comprising the steps of:

connecting calling station dial means to a special central station, transmitting identification signals from the station to the central station, said identification signals generated responsive to the operation of the station dial means or other signal means;

comparing calling party dialed signals to said identification signals stored at said central station for verification, and connecting the calling station to a called station if there is verification.

According to a feature of the invention the verification includes a code number verification as well as a credit verification, According to another feature of the invention the connection is automatically opened when means such as a peg counter indicates that the calling party has reached a credit limit.

Yet another feature of the present invention includes connecting a special dial tone from the central station to indicate that the dialing apparatus of the calling party station has been connected to the computer. A regular dial tone is transmitted to the calling party station when verification is complete and successful; that is, when the calling party has used the proper code number and has credit in his account to enable the call. Credit of course can be established by the desposit of money with the telephone company sufficient to make a certain number of calls.

BRIEF DESCRIPTION OF THE DRAWINGS

The above mentioned and other objects and features of the present invention will be best understood when considered in conjunction with the following description of the invention, explained with the aid of the accompanying drawings, wherein.

GENERAL DESCRIPTION

Figure 1:
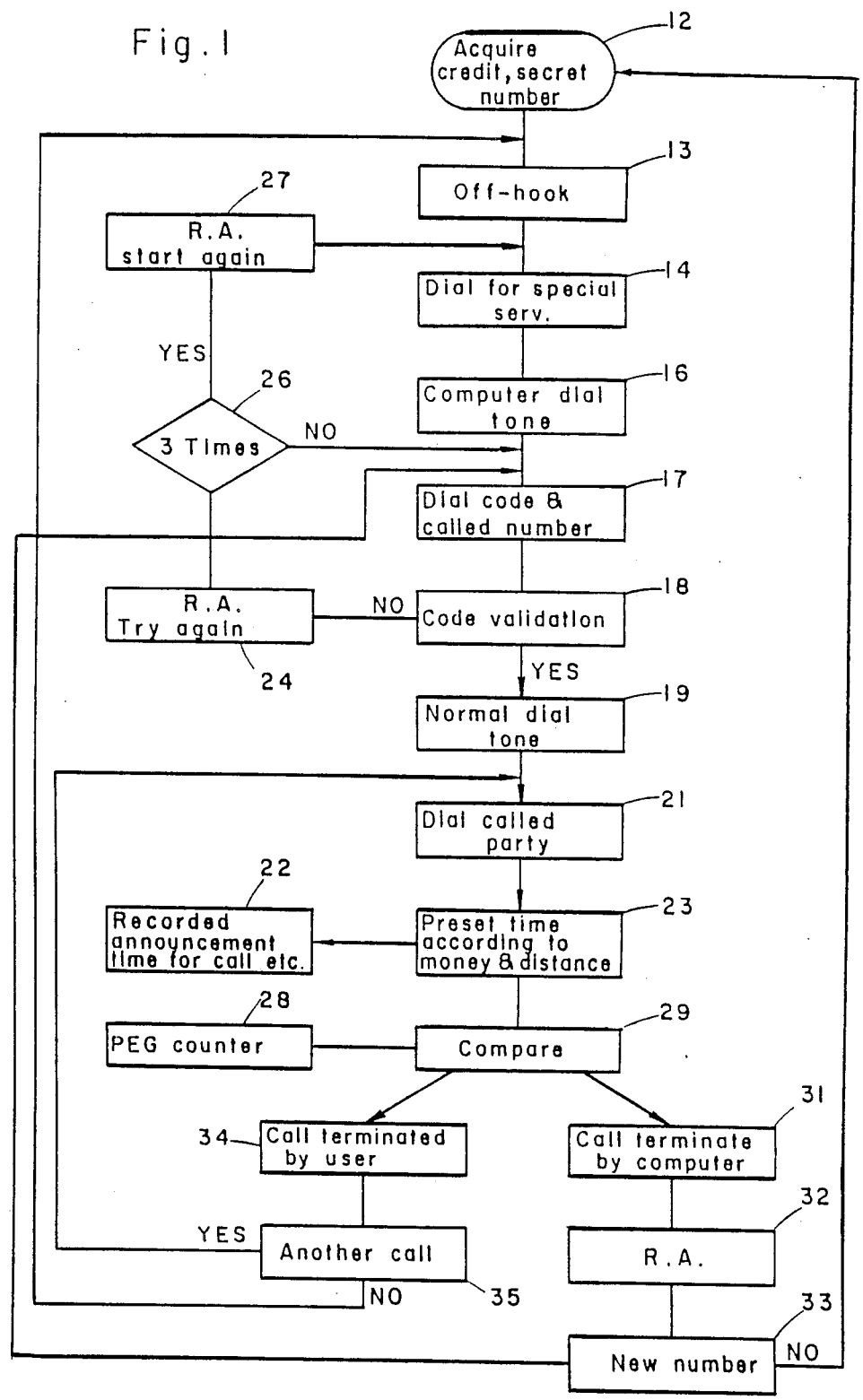
FIG. 1 is a flow chart showing the inventive use of any private telephone by a prepaid customer.

The customer, such as a regular telephone user or a traveller acquires a special code, a credit amount and the telephone number of the special central offices by either a cash or credit card payment. The code, the credit amount and telephone numbers may be acquired, for example through the regular credit card companies and charged to the acquirer's credit card. Alternatively, the credit amount, the telephone numbers and identifying code can be purchased at sales points such as in airports, hotels, rent-a-car stations and the like. The amount paid is credited to the acquirer for use against future telephone calls. The credited amount is stored in a memory at the special central office along with the special code. The acquisition of the code and telephone number is indicated at block 12 of FIG. 1.

Subsequently therto, the acquiring party wishes to make a telephone call which may be a local call or a toll call. He uses the nearest available telephone, removes the handset and dials a special central office, as indicated at blocks 13 and 14. The telephone in this example is a private station. When he is connected to the special central office (traveller phone services office) or exchange, 14, a special dial tone is sent from the special exchange to the calling station. When the calling party hears the special dial tone; indicating that the computer at the exchange is ready for him he dials the identifying code and the called number he wants as indicated at block 17. The computer at the special exchange checks the code and registers the desired called number.

If the code number is a genuine code with credit i.e. valid as indicated at block 18 and 19 a regular dial tone is sent to the calling party station as he is connected to the regular telephone system. The computer at the special exchange routes the call on the most economical available lines. According to prior arrangements with long distance line suppliers if it is a toll call.

The calling party's predialed numbers are transmitted as indicated at block 21. Of course the system can be arranged so that the calling party dials the called party responsive to receipt of regular dial tone.

In a preferred embodiment the special exchange equipment provides an artifical or prerecorded voice announcement stating the amount of credit available and that the amount of credit is equivalent to so many minutes of talking time on the call being connected. This announcement is actively shown at block 22. The announcement is made according to the charge rate for the distance between calling and called parties shown at block 23.

In a preferred embodiment the credit check is accomplished contemperaneously with the number code verification. If the code is invalid an announcement is made advising the customer to try again as shown at block 24. The customer is allowed a plurality of tries (such as three) before being disconnected from the special central office as shown at blocks 26 and 27. If he is trying again for the second and third times he is reconnected to receive the special dial tone. After the third time he is released from the special exchange after receiving a recorded announcement explaining that the code is not valid.

It is within the scope of the invention as previously desribed for the calling party to dial while the verification is being accomplished, in which case when the calling party hears normal dial tone, a register in the exchange can then input the dialed information to cause the exchange to complete the call between the calling party and the called party.

At this time as indicated by block 28 the normal time and distance computing circuit is shown as a peg counter, is put into service to provide information for timing the call against the available credit. The information from the peg counter is sent to a comparator 29 to continuously determine whether the calling party's credit is sufficient to pay for the call. When the credit equals the used time rate the call is automatically ended by the computer as indicated by the block 31.

Block 31 opens the connection between the calling and called party, the connection to the computer however remains and an announcement is made to notify the customer to insert another code number, if available. This activity is indicated at block 32. If a new code number is not inserted as indicated in block 33 by the yes output, then the calling party again received dial tone and can dial a new called party. In other words he goes back to the input to block 17 where he has computer tone and he is told to dial the code number and the calling party number. All the steps of block 17, 19, 21 etc are repeated and the new call is connected. If he does not have a new code number, then the connection between the computer and the calling party is open. The calling party is then merely off-hook with a phone set.

The call can also be terminated after block 29 by the user customer as indicated at block 34. In other words the call can be disconnected by the computer if he runs out of time or by the user. When the call is terminated by the user, and he still has credit, he is again connected to normal dial tone, and he merely has to dial another call, if he so desires. If he does not want to dial another call, then he returns the handset to the hookswitch. If he does not want to make another call he dials the number after hearing normal dial tone at the input block 19. Thus the customer does not have to repeat the entire connection back to the computer and have the validation procedure repeated. He had already been checked and validated and therefore he is connected to a normal dial tone. The process is repeated as long as credit remains.

Figure 2:
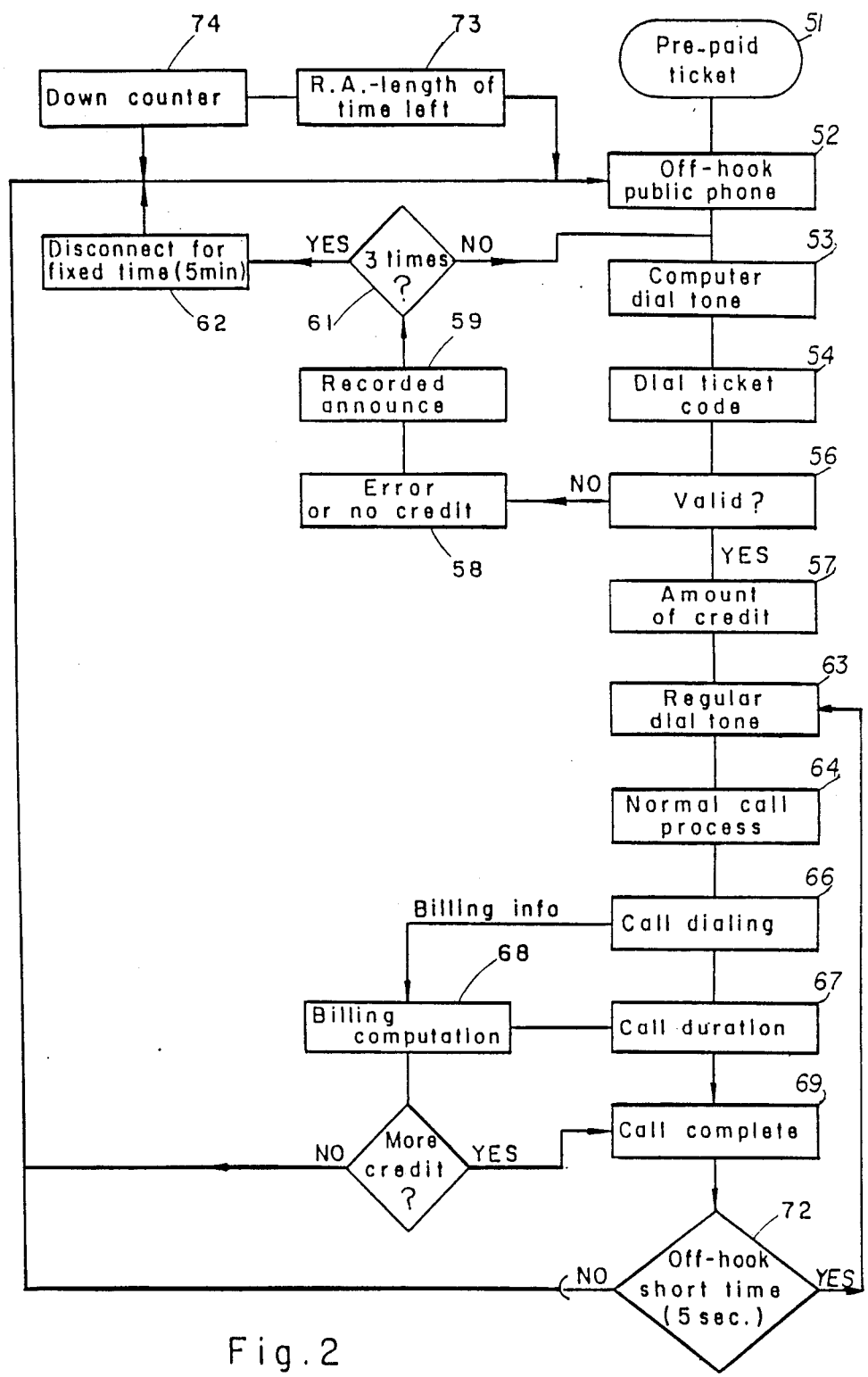
FIG. 2 is a flow chart showing the inventive use of dedicated paystations not requiring coins or special slugs.

FIG. 2 is the flow chart showing the use of dedicated public telephone. Here again the customer calling party must have a prepaid code number as indicated at 51. He goes off hook with the dedicated public telephone, indicated at block 52. The calling station receives computer dial tones as soon as going off hook as indicated at block 53. He then dials in the secret code number as indicated at block 54 and the system checks to see if he has a valid ticket number, if he does as indicated in block 56, he is visually or audibaly notified of the amount of credit available in his code as indicated in block 57.

If he does not have a valid code then as indicated in block 58 he is notified that he has inserted an invalid code. In a preferred embodiment a recorded message is sent as shown in block 59, and he is told that he has dialed an invalid code. He is allowed to err a plurality of times, say three as indicated at block 61.

If the inputted code is invalid less than three times, then he is again connected to the computer dial tone. If an invalid code is inputted more than three times then the phone is disconnected for a time period (say five minutes) as indicated at block 62. The disconnected time is to discourage practical jokers or anybody maliciously trying to tie up the telephone. After the five minutes time out the phone is returned to its normal operating capabilities. A recorded message indicated at block 73, may be sent to notify potential users that this phone is out of order for diminishing periods of time i.e. 3 minutes, 4 minutes etc.

After verification of the code number and credit the calling party is connected to the regular telephone system and receives regular dial tone as indicated at block 63. The calling party goes through the normal call process indicated in block 64. Responsive to his dialing indicated at block 66 he is given a call duration announcement indicating the length of call time his credit amount will allow. Block 67 also indicates the time change rate of the call this information is continuously computed and subtracted from the credit amount. The call can be terminated as indicated in block 69 either because no more credit or by the user. The user terminates by dialing a special code for example or by closing the hook switch to say ten seconds when there is any more credit left, as indicated at block 71 the calling party is directed back to regular dial tone i.e. to the input of block 63 as indicated in block 72. If there is no credit left then the calling party phone is back to where the phone is connected to the computer and receiving computer dial tone. if he does not dial in his code number after a given time period he is disconnected. In a preferred embodiment he is notified to input a code or be disconnected. This is indicated at block 73 and 74.

Figure 3:
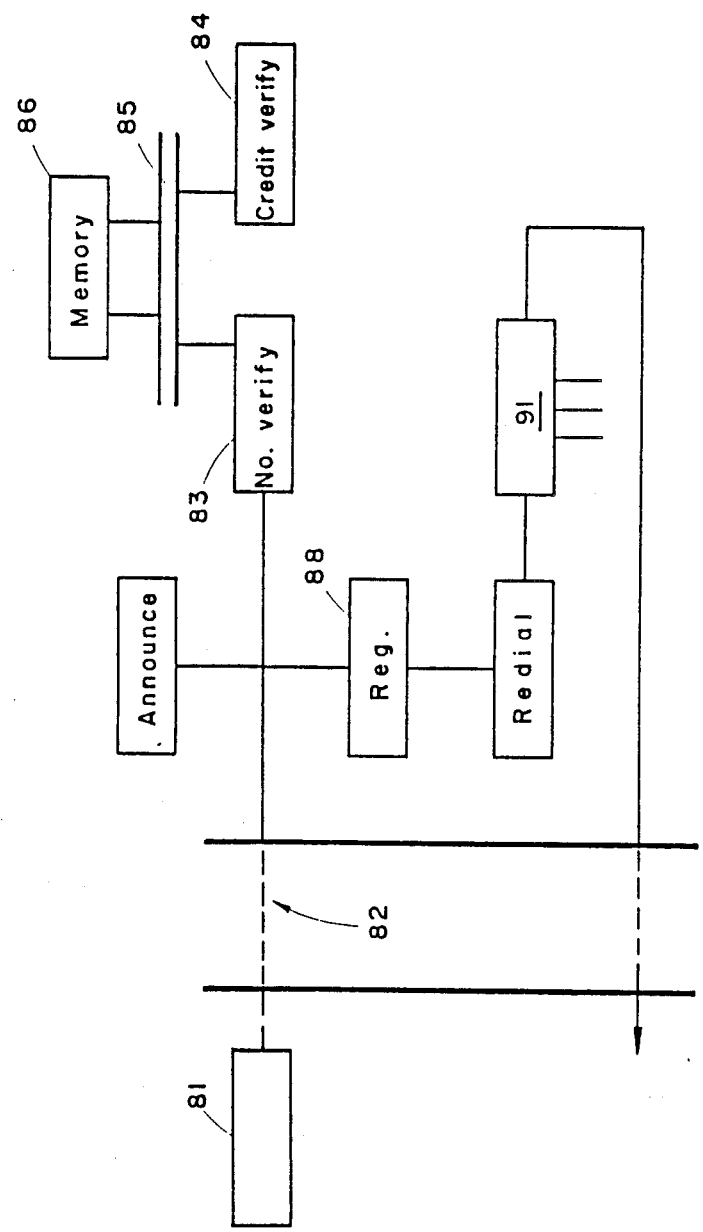
FIG. 3 is a block diagram showing of parts of the telephone system necessary for carrying out the invention.

In FIG. 3 the basic operation of the prepaid telephone call system is shown in block diagram form. The calling phone is indicated at 81. The telephone 81 is connected to a regular telephone system indicated at 82. The calling party dials the special charge number and by a code number verifier 83. The code number verifier looks into a section of the memory as indicated by the code to verify that the code is valid. When a valid code is confirmed the credit for that code is checked in the memory to determine how much credit is left. The announcing system for the purposes indicated in the flow diagram is shown at 87.

It should be understood that while announcement are shown, visual indication can also be used. However in a preferred embodiment audio announcement are used. When the number and credit are verified, the calling party is then connected through a register indicated at 88, to a re-dialer 89. The register stores the called number received from the calling party and directs the redialer 89 to dial the number after verification, the dialed number or dial tones are directed through router 91 to the regular telephone system. The router selects the best possible route cost-wise for the particular call if it is toll call.

The number verifier and credit verifier circuits are connected through a memory 86 through a bus 85. The memory is compartmentilized so that the code number can be easily checked through checking only a portion of the memory according to the code. Similarly verification of credit can be made once the code is verified by checking a separate portion of memory. The entire system is under the control of the local and routing computers 95.

Figure 4:
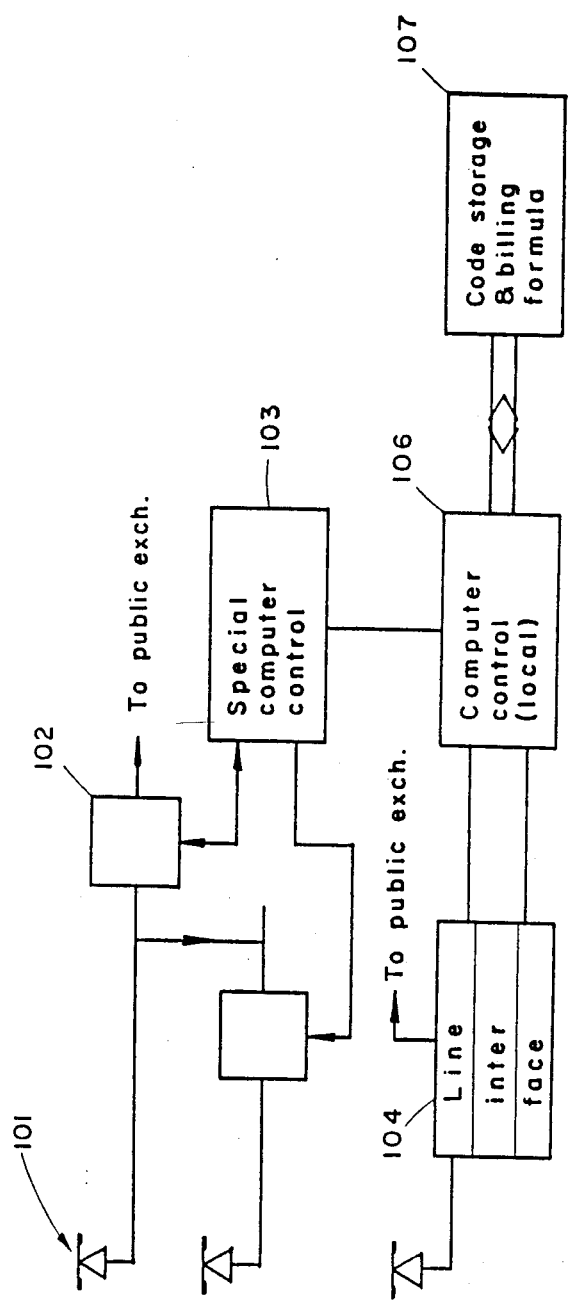
FIG. 4 is a block diagram view of a typical telephone system for using the invention.

FIG. 4 shows the dedicated public telephone in block diagram form. Herein the dedicated phones are shown at 101. The dedicated phones are connected through switches such as switch 102, and a regular exchange, to the special exchange. A special computer control 103 is located at the public exchange operated through a line interface 104. The telephones 101 are connected to the computer control 106 for code and credit verification in conjunction with memory 107. The dedicated telephone operates in much the same way as the private phone a difference in the special computer control used to time out the dedicated public telephone.

Thus, a telephone system is provided that can utilize prepayment for telephone calls which can be made from any telephone or from dedicated telephones.

The calling customer has the ability to disconnect from the called party and stay connected to the special exchange by dialing a special number for example. He can switch to another code number during the call, before the call and after the call and still remain connected to the special central office.

With the dedicated telephone when the calling party replaces the hand set the hook switch a short delay of say 10 seconds have passed, an announcement is made to the calling party notifying the calling party that he may call another party without calling the computer again within the allocated time.

According to a preferred embodiment special codes say 999 can be used to terminate a call. The calling party can then get another call without having to redial the special exchange and his code. Another special code say 888 can be used to input more credit with another code number.

It should be understood that when the calling party's credit is checked to institute a call and also during the call the position in the memory is supplied with a disenabling code to prevent the simultaneous use of the two different telephones on the same code. In addition the codes each have a home memory which other special exchanges can check.

Accordingly, a method of using any telephone for prepaid telephone calls is provided. A system is thus provided that benefits travellers and others having the need for the available of telephone service form any telephone.

While the invention is described using the example embodiment and method, it should be understood that this description is made by way of example only and not as a limitation on the scope of the invention.

What is claimed is:

1. A unique method for making telephone calls from any available telephone, said method comprising the steps of:
    (a) obtaining a special code by depositing a prepayment amount;
    (b) storing the prepayment amount in a memory in a special exchange for use in verifying calling party calls;
    (c) dialing said special exchange when a telephone call connection is desired;
    (d) inputting such special code for verification;
    (e) inputting the number of the called party;
    (f) verifying the special code and comparing the prepayment amount less any deduction for previous calls in the memory and the minimum cost of the inputted call;
    (g) connecting called party to the calling party in response to the verification;
    (h) monitoring the prepayment amount less deductions for the running cost of the call; and
    (i) disconnecting said call when the prepayment amount has been spent.

2. The method of claim 1 whrein sad connecting step includes special routing.

3. The method of claim 1 including retaining the connection between the calling station and the special exchange for a set period of time after the call is terminated.

4. The method of claim 1 including the step of preventing reconnecting the calling party to the special exchange for a definite time period after a set number of no verification encounters.

5. The method of claim 1 including the step of interconnecting a plurality of special exchanges, and
 exchanging code and credit information between the interconnected special exchanges.

6. The methof of claim 1 including the step of disconnecting the called party station while keeping the calling party station connected to the special exchange to enable the calling party to connect to another called party.

7. The method of claim 1 including the step of adding to the prepayment while connected to the special exchange.

8. The method of claim 1 including the step of preventing the use of the same special code from different calling party stations at the same time.

9. A telephone system for facilitating telephone calls including toll calls from any available telephone station for prepaid customers, said system comprising:
 (a) means for coupling a calling party station to a special exchange;
 (b) memory means in said special exchange for storing special customer codes and credit information individual to each prepaid customer;
 (c) means for verifying said calling party responsive to a code transmitted from the calling party's station to the special exchange when one of the codes matches the code in the memory means and the calling party has unused credit and;
 (d) means for completing a call from said calling party station to a called station responsive to said verification, said means for verifying including means for monitoring the credit of the calling party during a completed call.

10. The system of claim 9 wherein said means for completing includes least cost routing means.

11. The system of claim 10 wherein said least cost routing means includes means for choosing between long lines, satellite and/or microwave links.

12. The system of claim 11 wherein said means for monitoring includes means for continuously monitoring the credit of the calling party during a completed call.

13. The system of claim 12 including peg counter means for indicating that the prepaid customer has reached its credit limit.

14. The system of claim 11 wherein said calling station is a dedicated public phone including means for coinless coupling to said special exchange.

15. The system of claim 11 wherein timing means are provided for retaining the coupling between said calling party station and said special exchange for a certain time period after the called party station goes on hook.

16. The system of claim 11 including special dial tone generating means for indicating connection of the calling station to said special exchange.

17. The system of claim 11 including means for notifying the prepaid customer of the amount of credit available.

18. The system of claim 11 and means for preventing recoupling to said special exchange for a set time period responsive to a certain number of consecutive no verification occurences.

19. The system of claim 11 and means for interconnecting a plurality of special exchanges to enable the interchange of code and credit information.

20. The system of claim 11 and means for disconnecting the called party station while keeping the calling party station coupled to the special exchange to enable the calling party to dial another called station through the special exchange.

21. The system of claim 11 and means for adding credit while coupled to the special exchange.

22. The system of claim 11 and means for preventing use of the same special code from two different calling party stations at the same time.

23. A method for making telephone calls comprising:
 (a) issuing a valid special code to a calling party when a prepayment amount is deposited to the credit of said calling party;
 (b) storing the prepayment amount in a memory in a special exchange;
 (c) dialing said special exchange when the calling party wishes to make a telephone call to a called party;
 (d) inputting a special code and the number of the called party;
 (e) connecting the calling party to the called party only if the special code inputted by the calling party is a valid special code, and in addition, only if the current initial prepayment amount in the memory exceeds the minimum cost of a call to the inputted number;
 (f) monitoring the running cost of the call in accordance with its duration;
 (g) disconnecting the calling party from the called party when the calling party hangs up, or when the running cost of the call exceeds the current initial prepayment amount, whichever occurs first; and
 (h) deducting from the initial prepayment amount the running cost of the call.

* * * * *

(12) REEXAMINATION CERTIFICATE (4758th)
United States Patent
Kamil

(10) Number: US 4,706,275 C1
(45) Certificate Issued: Apr. 8, 2003

(54) TELEPHONE SYSTEM

(75) Inventor: Zvi Kamil, Ramat Gan (IL)

(73) Assignee: Aerotel Ltd., Ramat Gan (IL)

Reexamination Request:
No. 90/005,580, Dec. 2, 1999
No. 90/005,725, May 15, 2000
No. 90/005,951, Mar. 14, 2001

Reexamination Certificate for:
Patent No.: 4,706,275
Issued: Nov. 10, 1987
Appl. No.: 06/797,658
Filed: Nov. 13, 1985

(51) Int. Cl.[7] ............................................. H04M 15/00
(52) U.S. Cl. ........................ 379/114.2; 379/114.17; 379/114.01; 379/154; 379/155
(58) Field of Search ........................ 379/112, 114, 379/115, 144, 91.01, 120, 114.01, 114.15, 114.17, 114.2, 114.03, 121.01, 126; 455/405, 406, 407, 408, 409

(56) References Cited

U.S. PATENT DOCUMENTS

| | | |
|---|---|---|
| 3,022,381 A | 2/1962 | Pferd et al. ................... 179/6.4 |
| 3,087,018 A | 4/1963 | Pferd ........................... 179/6.4 |
| 3,189,687 A | 6/1965 | Miller .......................... 179/18 |
| 3,428,948 A | 2/1969 | Simjian ....................... 340/147 |
| 3,564,210 A | 2/1971 | Presti ......................... 235/61.7 |
| 3,571,799 A | 3/1971 | Coker, Jr. et al. .......... 340/152 |
| 3,652,795 A | 3/1972 | Wolf et al. ................. 179/2 DP |
| 3,676,597 A | 7/1972 | Peterson .................. 179/6.3 R |
| 3,769,463 A | 10/1973 | Graham et al. .......... 179/7.1 TP |
| 3,870,866 A | 3/1975 | Halpern ................. 235/61.7 R |
| 3,896,266 A | 7/1975 | Waterbury ................ 179/1 SB |
| 3,929,278 A | 12/1975 | Balavoine et al. ..... 235/61.8 R |
| 3,938,091 A | 2/1976 | Atalla et al. ............. 340/149 A |
| 3,985,998 A | 10/1976 | Crafton ................. 235/61.7 B |
| 4,028,494 A | 6/1977 | Zarouni |
| 4,122,308 A | 10/1978 | Weinberger et al. |
| 4,139,739 A | 2/1979 | von Meister et al. |
| 4,146,746 A | 3/1979 | de Crepy et al. ....... 179/7.1 TP |
| 4,160,129 A | 7/1979 | Peyser et al. ............. 179/18 E |
| 4,162,377 A * | 7/1979 | Mearns ........................ 379/221 |
| 4,182,934 A | 1/1980 | Keys et al. ................... 179/7 R |
| 4,191,860 A | 3/1980 | Weber ....................... 179/18 B |
| 4,192,972 A | 3/1980 | Bertoglio et al. |
| 4,204,113 A | 5/1980 | Giraud et al. ............... 235/375 |
| 4,224,472 A | 9/1980 | Zarount .................. 179/7.1 R |
| 4,232,199 A | 11/1980 | Boatwright et al. ...... 179/18 B |
| 4,256,955 A | 3/1981 | Giraud et al. ............... 235/380 |
| RE30,821 E | 12/1981 | Goldman ............... 340/825.54 |
| 4,326,123 A | 4/1982 | Hosterman .................. 235/380 |
| 4,332,985 A | 6/1982 | Samuel ......................... 179/90 |
| 4,367,402 A | 1/1983 | Giraud et al. ............... 235/380 |
| 4,410,765 A * | 10/1983 | Hestad et al. ............... 379/221 |
| 4,439,636 A * | 3/1984 | Newkirk et al. ............. 379/221 |
| 4,449,040 A | 5/1984 | Matsuoka et al. |
| 4,467,424 A | 8/1984 | Hedges et al. ............... 364/412 |
| 4,468,529 A | 8/1984 | Samuel et al. .......... 179/18 BA |
| 4,501,958 A | 2/1985 | Glize et al. ................. 235/382 |
| 4,506,116 A | 3/1985 | Genest .................. 179/90 BD |
| 4,513,175 A | 4/1985 | Smith ..................... 179/18 BA |
| 4,517,412 A | 5/1985 | Newkirk et al. ......... 179/7.1 R |
| 4,518,824 A | 5/1985 | Mondardini .......... 179/6.3 CC |
| 4,559,415 A | 12/1985 | Bernard et al. ........... 179/2 DP |

(List continued on next page.)

FOREIGN PATENT DOCUMENTS

| | | |
|---|---|---|
| CA | 1 143 494 | 3/1983 |
| CA | 1162336 | 2/1984 |
| DE | 23 51 949 | 4/1975 |

(List continued on next page.)

OTHER PUBLICATIONS

"European Prepayment Telephone Card Systems", Charles Hopper, *Communications International,* Jan. 1984, pp. 76–80.

(List continued on next page.)

*Primary Examiner*—Rexford Barnie

(57) ABSTRACT

A telephone system enabling prepayment for telephone calls, wherein special code and credit information is stored in memory in special exchanges and debited as the call progresses.

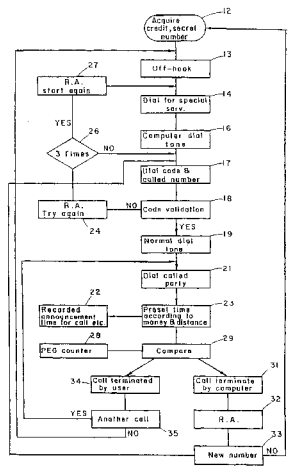

U.S. PATENT DOCUMENTS

| | | | |
|---|---|---|---|
| 4,577,061 A | 3/1986 | Katzeff et al. | 179/2 AM |
| 4,580,011 A | 4/1986 | Glaser | |
| 4,595,983 A | 6/1986 | Gehalo et al. | 364/401 |
| 4,611,096 A | 9/1986 | Asmuth et al. | 179/18 B |
| 4,616,852 A | 10/1986 | Cash | 282/27 R |
| 4,669,730 A | 6/1987 | Small | 273/138 A |
| 4,673,802 A | 6/1987 | Ohmae et al. | 235/379 |
| 4,680,785 A | 7/1987 | Akiyama et al. | 379/57 |
| 4,685,127 A | 8/1987 | Miller et al. | 379/221 |
| 4,698,752 A | 10/1987 | Goldstein et al. | 364/200 |
| 4,707,592 A | 11/1987 | Ware | 235/379 |
| 4,759,056 A | 7/1988 | Akiyama | 379/197 |
| 4,768,222 A | 8/1988 | Kalfon | 379/91 |
| 4,768,223 A | 8/1988 | Kinoshita et al. | 379/143 |
| 4,782,519 A | 11/1988 | Patel et al. | 379/221 |
| 4,791,640 A | 12/1988 | Sand | 370/58 |
| 4,792,968 A | 12/1988 | Katz | 379/92 |
| 4,792,973 A | 12/1988 | Gilhousen et al. | 380/24 |
| 4,870,679 A | 9/1989 | Hanna et al. | 379/114 |
| 4,879,744 A | 11/1989 | Tasaki et al. | 379/144 |
| 4,897,870 A * | 1/1990 | Golden | 379/221 |
| 4,926,996 A | 5/1990 | Eglise et al. | 194/212 |
| 5,003,585 A | 3/1991 | Richer | 379/144 |
| 5,068,891 A | 11/1991 | Marshall | 379/91 |
| 5,153,906 A | 10/1992 | Akiyama | 379/112 |
| 5,251,252 A | 10/1993 | Katz | 379/92 |
| 5,359,645 A | 10/1994 | Katz | 379/93 |
| 5,790,636 A | 8/1998 | Marshall | 379/67 |
| 5,898,762 A | 4/1999 | Katz | 379/93.12 |

FOREIGN PATENT DOCUMENTS

| | | | |
|---|---|---|---|
| DE | 25 03 423 | | 7/1975 |
| DE | 29 03 450 | | 8/1980 |
| DE | 29 03 479 | | 8/1980 |
| DE | 34 06 615 | | 8/1984 |
| EP | 0 009 684 | | 4/1980 |
| EP | 0015120 | | 9/1980 |
| EP | 0041261 | | 12/1981 |
| EP | 0 048 868 | | 4/1982 |
| EP | 0 060 643 | | 9/1982 |
| EP | 0 066 823 | | 12/1982 |
| EP | 0 088 639 | | 9/1983 |
| FR | 1544542 | * | 4/1979 |
| FR | 2 522 850 | | 9/1983 |
| FR | 2 542 115 | | 9/1984 |
| FR | 2 575 016 | | 6/1986 |
| GB | 1124945 | | 8/1968 |
| GB | 1 124 945 | | 8/1968 |
| GB | 1352 600 | | 5/1974 |
| GB | 1400 654 | | 7/1975 |
| GB | 1 442 883 | | 7/1976 |
| GB | 1 505 718 | | 3/1978 |
| GB | 1 520 529 | | 8/1978 |
| GB | 1 544 542 | | 4/1979 |
| GB | 1544542 | | 4/1979 |
| GB | 2 046 556 | | 11/1980 |
| GB | 2046556 A | * | 11/1980 |
| GB | 2 057 740 | | 4/1981 |
| GB | 2 065 353 | | 6/1981 |
| GB | 21413 | | 6/1983 |
| GB | 2 118 341 | | 10/1983 |
| GB | 2 120 507 | | 11/1983 |
| GB | 2141309 | | 12/1984 |
| GB | 2 141 309 | | 12/1984 |
| GB | 2141309 A | * | 12/1984 |
| JP | 48-90110 | | 11/1973 |
| JP | 52-16941 | | 2/1977 |
| JP | 52-17740 | | 2/1977 |
| JP | 52-21738 | | 2/1977 |
| JP | 53-39808 | | 4/1978 |
| JP | 53-039808 | | 4/1978 |
| JP | 53-115109 | | 10/1978 |
| JP | 53-132919 | | 11/1978 |
| JP | 54-95592 | | 5/1979 |
| JP | 54-89509 | | 7/1979 |
| JP | 55-107375 | | 8/1980 |
| JP | 55-166370 | | 12/1980 |
| JP | 56-4969 | | 1/1981 |
| JP | 56-20371 | | 2/1981 |
| JP | 56-101016 | | 6/1981 |
| JP | 56-98966 | | 8/1981 |
| JP | 57-24157 | | 2/1982 |
| JP | 57-73471 | | 5/1982 |
| JP | 57-125567 | | 8/1982 |
| JP | 57-125569 | | 8/1982 |
| JP | 57-125570 | | 8/1982 |
| JP | 57-127903 | | 8/1982 |
| JP | 58-3367 | | 1/1983 |
| JP | 58-003367 | | 1/1983 |
| JP | 58-165473 | | 9/1983 |
| JP | 58-221559 | | 12/1983 |
| JP | 59-16068 | | 1/1984 |
| JP | 59-108446 | | 6/1984 |
| JP | 59-190771 | | 10/1984 |
| JP | 59-208973 | | 11/1984 |
| JP | 60-10868 | | 1/1985 |
| JP | 60-14563 | | 1/1985 |
| JP | 60-35868 | | 2/1985 |
| JP | 60-220655 | | 11/1985 |
| JP | 61-6163 | | of 1986 |
| JP | 61-210754 | | 9/1986 |
| JP | 2763082 (5-284257) | | 10/1993 |
| WO | WO/81/01664 | | 6/1981 |
| WO | WO 84/01073 | | 3/1984 |
| WO | WO 87/02208 | | 4/1987 |

OTHER PUBLICATIONS

"US Banks Prodded on Smart Card", *American Banker*, Feb. 7, 1983, pp. 3 and 10.

"Charge–A–Call Spreading Rapidly", Betty Estes, *Telephone Engineer and Management*, Jan. 1, 1979, p. 89.

"Payphones in the Nineteen–Eighties", J.R. Lewin, British Telecommunications Engineering, vol. 1 1982.

Arden, Bruce W., ed., *What Can be Automated?: The Computer Science and Engineering Research Study (COSERS)*, MIT Press, 1980, pp. 762–764).

Meadow, Charles T., *Applied Data Management*, 1976, p. 147.

Freeman, Peter., *Software System Principles*, 1975, p. 137.

"Approximating the Performance of Two Phase Locking Using an Iteration Solution Model", Chen, D. et al., *The University of Michigan Computing Research Laboratory Technical Report CRL–TR–25–84*, Apr. 1984, pp. 1–3.

"Locking Primitives in a Database System", Korth, Henry F., *J. ACM 30*, 1 (Jan. 1983), pp. 55–79).

"Operand Consistency Attendant: An Associative Solution to the Data Field Consistency Problem", *IBM Technical Disclosure Bulletin*, vol. 19 No. 1, Jun. 1976, pp. 222–224.

"A Switch in the Resale Direction", *Telephone Engineer and Management*, Mar. 15, 1983, pp. 64–66.

"Resale—An Overview", Bob Stoffels, *Telephone Engineer and Management*, May 1, 1982, pp. 67–69.

"Reseller Analyzes Equipment Options", Frank D. Reese, *Telephone Engineer Management*, Jun. 1, 1983.

"National Pay Telephone Answers The Calls For Credit––Card Phones", *Business Week*, Dec. 17, 1984, pp. 112.

"Impacts of Calling Card Service (CSS) Implementation", John Bagley, *GTE Automatic Electric Journal,* May–Jun. 1982, pp. 99–108.

"French 'Smart Cards' Explained to American", Leo Anderson, *Telephony,* Apr. 19, 1982, pp. 9–10.

"Don't Tell It—Dial It", Allison Mearns et al., *Bell Laboratories Record,* May/Jun. 1982, pp. 117–119.

"Notes on the BOC INTRA–LATA NETWORKS", 1983, p. 14.

"AT&T Card Caller Public Telephone 'A Significant Technical Advance,'" *AT&T Consumer Products Challenge,* No. 11, Dec. 19, 1983.

Corman, B., "Resale—A Case History." *Telephone Engineer & Management,* May 15, 1982.

Gibson, G.T., "A Fleeting Market for AT&T's Resellers," *Venture,* Oct. 1982, pp. 62, 64–65.

Gunn, H., "Efficiency and Savings Boosted by BVA and BNS Techniques," *Telephony,* Feb. 21, 1983, pp. 114, 116.

Hopper, C., "European Prepayment Telephone Card Systems," *Communications International,* vol. 11, No. 1, Jan. 1984, pp. 76–80.

Reese, F.D., "Reseller Analyzes Equipment Options," *Telephone Engineer & Management,* Jun. 1, 1983.

Stoffels, B., ed., "Resale—An Overview," *Telephone Engineer & Management,* May 1, 1982, pp. 67–69.

"A Switch in the Resale Direction," *Telephone Engineer & Management,* Mar. 15, 1983, pp. 64–66.

Toth, V.J., et al., "Does Resale Have an Identity Crisis?" *Telephone Engineer & Management,* Mar. 15, 1983, pp. 147–148, 150.

Turbat, A., "Telepayment and Electronic Money—The Smart Card."

Weinstein, S.B., "Smart Credit Cards: The Answer to Cashless Shopping," *IEEE Spectrum,* Feb. 1984, pp. 43–49.

White, J.A., "Western Union Buys 50% AirFone Stake, Airlines Sign for In–Flight Phone Service," *The Wall Street Journal,* Dec. 17, 1981, p. 52.

Wiblé, P.A., "Le Téléphone à Carte: Un Nouveau Service," *La Revue Polytechnique,* No. 1402, pp. 1171–1175.

Yoshizawa, K., et al., "Voice Response System for Telephone Betting," *Hitachi Review,* vol. 26, No. 6 (1977), pp. 215–220.

"Telephone Management System User Manual," Version 1.0, Oct. 23, 1981.

National Applied Computer Technologies, "ATS III/65 Automated Long Distance Telephone Service User's Guide," Version 1.5, Jul. 1983.

National Applied Computer Technologies, "ATS III/65 Automated Long Distance Telephone Service User's Guide," Version 2.0, Oct. 1983.

Adolphs, V.D., "Münzfernsprecher NT 2000 mit Mikrorechner*", *Feinwerktechnik—Messtechnik,* 1988.

Aisenberg, A. & Sorani, S., "A Distributed Control System for Public Telephones in Israel", p. 171.

Aldrich, N., "Choosing A Telecommunications Consultant", *Hospital Topics,* Mar./Apr. 1981, pp. 7–8.

"An active device for charge analysis and monitoring", *Telecommunications Journal,* Mar. 1983, p. 152.

Antelman, Leonard, "Hart Industries Files Bankruptcy", *Electronic News,* Dec. 7, 1981.

Armstrong, S., "The 'smart card': revolution in the way you pay bills?", Sep. 13, 1983.

Arnold, P.A. "Card Operated Payphones Can Simplify Service and Security" *Telephony,* Sep. 1982, pp. 56–57.

"Autelca", *Telecommunications Journal,* Sep. 1985.

Baggott, A.J., "Token Meters", *Telecommunicatoins Journal,* Apr., 1977, pp. 35–37.

Berenyl, I., "Telefax, Smart Phones Debut in Hungary, but Service Remains Limited", *Telephony,* Sep. 23, 1985, pp. 85–86.

Bertman, L.A., "Communications Are Integrally Related To Cost Containment, Employee Retention, and Increased Revenue", Hospital Topics, Jul./Aug. 1984.

Block, V., "FCC Rules Pay Phones Subject to Regulation", *In The Nation's Capital,* Jun. 3, 1985, pp. 17–19.

Borison, V. S. "TRANSACTION—Telephone Gets the Facts at the Point of Sale", *Bell Laboratories Record,* Oct., 1975, pp. 377–383.

Bowin, W.F., "Understanding the Paystation—types, control, terminology, improvements (all in simple English)", *Telephone Engineer & Management,* Jun. 15, 1972, pp. 54–60.

"Broward man charged in phone fraud" Nov. 24, 1981.

Caesperlein, Hermann, "Münzfunkfernsprecher bei der Deutschen Bundesbahn", 1980, pp. 551–554.

Cane, A., "The 'electronic chequebook' makes its debut", *Financial Times,* Aug. 9, 1983.

"Call up the future with Phonocard. Pre–paid card public telephone box", *Telecommunications Journal,* Aug. 1979.

Cariou, J. & Lardy, D. "The Freephone Service: A New Application for the E12 System", *Commutation and Transmission,* 1982, vol. 5, pp. 63–73.

"Coin–Operated Phones—Back To The Future", *TE&M,* Mar. 15, 1987, pp. 57–59, 61.

*Communication & Electronics,* Nov. 1970–Oct. 1971.
*Communication & Electronics,* vol. 6, No. 1, Nov. 1971.
*Communication & Electronics,* vol. 7, No. 1, Nov. 1972.
*Communication & Electronics,* vol. 8, No. 1, Nov. 1973.
*Communication & Electronics,* Nov. 1973–Oct. 1974.
*Communication & Electronics,* vol. 9, No. 11, Sep. 1975.
*Communication & Electronics,* May 1980–Apr. 1981.
*Communication & Electronics,* May 1981–Apr. 1983.

Crabbe, E., et al., "DMTM: A Data Management and Transmission Module", *CTE Automatic Electric Journal,* 1983, pp. 51–56.

Curran, L., "Revisiting the Luddites", *BYTE Publications, Inc.,* vol. 9, No. 1, Jan., 1984, p. 4.

"Data Sheet", *Data Communications,* Oct. 20, 1982.

Demeautis, M. & Hummel, F. "The TV 200 A Transactional Telephone".

Dickerson, B., "Bell Cuts WATS Service to Hart" (1981).

Dickerson, B., "Canadian Firm Could Get Hart Industries' Remaining Assets" 1982.

Dickerson, B., "FCC Delay Snarls Long–Distance Phone Plan" 1980.

Dickerson, B., "State Orders Hart To Offer Full Refunds".

Dickerson, B., "Hart Delays Long Distance Service Again".

Dickerson, B., "Credibility the First Hurdle for Discount Phone Call Firm" *Communications,* Mar. 9, 1981.

Dickerson, B., "Hart Gets Approval for Long–distance Calls", *The Miami Herald,* Apr. 29, 1981, p. 6D.

Dickerson, B., "Hart Industries' Lines Still Clogged" Jul. 15, 1981.

Dorros, I., "Reaching Into the Future with Stored Program Control", *Bell Laboratories Record,* Dec. 1980, pp. 387–393.

"Eighty Years of Public Telephones" NTT Business, vol. 32., No. 1, 1981, pp. 8–11.

*Eiektrisches Nachrichtenwesen,* Band 58, Nummer 1, 1983.
"Electronisches Geld" *Kommunikationstechnik,* Mar. 1985, pp. 39–41.
Eriksson, G., "Voice and Data Workstations and Services in the ISDN", *Ericsson Review,* 1984, pp. 14–19.
"Fernsprechapparate" *Eiektriscnes Nasnachterwesen,* 1983, pp. 54–55 and 58–59.
"FCC Approves World's First Smart Card Telephone", Jul. 15, 1985.
Finneran, M.F., "Data Comm Focus", *Business Communications Review,* Nov./Dec. 1985, pp. 35–40.
"Fire Destroys Hart Industries", 1981.
"For every telephone *Monoprint* records the price, the hour, the date, the length, the number. And that's not all . . . ", *Telecommunications Journal,* Dec., 1979.
"France: Poised to Deliver the Backbone for the information age", *Data Communications,* Jun. 1983.
"French EFT Program Enters its Final Phase", *Data Communications,* Jun. 1983.
Fritz, M.S. & Talley, J., "Bloomington Hospital's Experience With Lifeline", *Hospital Topic,* Sep./Oct. 1982, pp. 14–18.
"The French Smart Card Finally Arrives in the U.S.", *Data Communications,* Nov. 1984, pp. 263–265.
Grizzle, J.W., & Marcus, S.I., "A Decentralized Control Strategy For Multiaccess Broadcast Networks", 1982, pp. 75–88.
Grunig, R., "Halser Mailmaster F 204 Franking Machine", Hasler Review, vol. 11, No. 1, 1978.
Haggerty, M., "Firms Sell Varying Ways To Save", Aug. 8, 1981.
Haggerty, M., "Talk is Cheaper Long–distance callers have alternatives to Bell" *Money,* Aug. 8, 1981.
Harrop, P., "New Electronics for Payment", 1982, pp. 339–342.
"Hart Industries settles", Jul. 28, 1981.
"The History of the Payphone", http://www.kitecom.co.uk/phone/histor1.html.
Harvey, D., "This BOSS Works for Residence Customers", *Bell Laboratories Record,* Mar. 1980, pp. 81–86.
Higashiyama, F. & Murata, M., "Credit Call Service", *Engineering Bureau NTT,* pp. 308–309.
Hughes, L.A., "New Phone Service Faces First–Day Problems", *The Miami Herald,* Jul. 8, 1981.
Hughes, L.A., "Hart Users Still Hear Busy Signals", *The Miami Herald.*
"IC Cards Are On The Way", *TE&M,* May 15, 1987, pp. 71, 74–75.
*IEEE,* Apr. 22–Apr. 24, 1975.
*IEEE,* Oct. 10–13, 1977.
*IEEE,* Oct. 23–25, 1979.
*IEEE,* May 24–28, 1981.
JP. Ref No. 12.
Kamil, Z., "Procédé pour effectuer des appels téléphoniques et systéme téléphonique", Nov. 10, 1985.
KDD Technical Journal, Oct. 1978, No. 98.
Komatsu, Hiroyuki, "Station Message Detailed Accounting System KX–400", *Iwatsu Gino,* vol. 21., No. 1. 1982.
An, C. et al. "Helping the Stored Program Controlled Network Respond Quickly", *Bell Laboratories Record,* May/Jun. 1982, pp. 120–122.
Kutler, J., "Experts Discussing Future of Smart Card Wonder When Their Chip Will Come In", *Back Page.*

Lannon, J.F., "How To Save Money and Increase Our Telecommunications Capabilities", *Hospital Topics,* Sep./Oct. 1982, pp. 30–34.
Lawser, J.J., & Sheinbein, D., "Realizing the Potential of the Stored Program Controlled Network", *Bell Laboratories Record,* Mar. 1979, pp. 85–89.
Ledger, V.W., "US Vanguard Visits France To Look at the Smart Card", *American Banker,* Aug. 11, 1982.
Lessin, "Smart Card Technology and How It Can Be Used", *American Banker,* May 20, 1982.
Lipman, A.D., "Computer II and Coinless Pay Phones", *Telephony,* Sep. 16, 1985, pp. 53–57.
Lissandrello, G.J., "Future's Bright For Smart Cards" *Telephone Engineer & Management,* Nov. 1, 1985.
"Long–distance refunds sought".
Lucking, K.F.C. "Card Operated Pre–Payment Metering".
"MAKATEL, das Authorisierungstelefon im Geschäftsverkehr mit Kreditkarden".
Matsui, H. et al., "A Multi–Functional Telephone with Memory Cards Which Expand Talking Services" *Consumer Electronics,* vol. 34 No. 3, Aug. 1988, pp. 749–758.
Meier, A.R., "Major Real Estate Developers Building Huge New Telephone Resale and Tenant Services Industry", *Business Communications Reveiw,* pp. 21–22.
Merzer, M., "Cut–rate Long Distance Calls Replace AT&T's Monopoly", *Communications,* p. 6.
"Microcomputers for the Telephone", *Telecommunications Journal,* Mar. 1983. pp. 151–152.
Mier, E. E., "Inside the Smart Card", *Data Commuications,* Jun. 1982.
Mills, M., "Memory Cards: a New Concept in Personal Computing", *BYTE Publications Inc.,* Jan. 1984, pp. 154, 156, 159–160, 162, 164, 166, 168.
Moshavi, S., "Please Deposit No Cents", *Forbes,* Aug. 16, 1993, p. 102.
Moskoff, George R., "Options for Call Accounting", *Business Communications Review,* Mar.–Apr. 1985.
"Multimil Introduces Credit Cardsized Computer and Related Communications Products to Industry Leaders During Dallas Launch" May 1, 1985.
Nather, V.P., "Prüfung von Digitalen Bausteinen und Leiterplatten Schwerpunkt: LSI", *Feinwerktechnik–Messtechnik,* 1980.
"National Pay Telephone Answers The Call For Credit–Card Phones", *Business Week,* Dec. 17, 1984, p. 112.
"Newsfront", *Data Communications,* Jan. 1984.
"Phonecard. A Solid Investment", Telecommunications Journal, Aug. 1985.
"Phonotaxe BTE60. Sodeco simplifies the coin telephone", *Telecommunications Journal,* Sep. 1985.
"PR Newswire", Jul. 15, 1985.
"Public Telephone" pp. 17–22.
"Public Telephony/Exchange Systems", http://www.urmet.it/ertt2.htm, 1996.
"Remote Management by Sodeco. A New Form of Intelligence.", *Telecommunications Journal,* Oct. 1985, p. a34.
Salant, J.D., "Firm Gives Alternative to Ma Bell".
Sinopoli, J., "Adapting RFP's for Shared Tenant Services", *Business Communications Review,* May–Jun. 1985, pp. 7–10.
"Simple call meters or electronic control units, our systems meet everyone's requirements: from private subscribers to telecommunications administrations", *Telecommunications Journal,* Nov. 1979.

Sheets, L.L., "Signaling Systems" pp. 165–174.

Smart, T., "Hart Accused of Giving 'Pathetic' Telephone Service", Oct. 10, 1981.

"A Smart Card Combine on the Verge of a Standard", *Data Communications,* Apr. 1984.

"Smart Cards Ready for Major Push in France", *Data Communications,* Sep. 1985.

"State–of–the–art technologies for the metering and handling of telephone charges", *Telecommunications Journal,* Jun. 1983, pp. a33.

Svigals, J., "Low Cost Point–of–Sale Terminal" *IBM Technical Disclosure Bulletin,* vol. 25 No. 4, Sep. 1982, pp. 1835.

*Telephone Engineer& Management,* Oct. 1, 1984.

"Telephone Products Win Federal Approval", *American Banker,* Aug. 7, 1985.

"Toward a More Automated Network TSPS Enhancements Lead the Way", Feb. 8, 1982.

"US Sprint Greets Second Year With Operator Service, Foncard", *Telephony,* Jul. 6, 1987.

Young, E., "Competition Rings A Bell", May 26, 1981.

Wainwright, R., "Subscriber Electronics", pp. 56–57.

"We are the specialists for telephone call charge meters", *Telecommunications Journal,* Apr. 1977, p. a33.

Weinstein, S. B., "Emerging Telecommunications Needs of the Card Industry", *IEEE Communications Magazine,* vol. 22 No. 7, Jul., 1984, pp. 26–31.

Wible, V.P., "Bargeldloses Telephonieren mit Phonocard", *Janrgang,* 1990.

Williamson, J., "British Telecom Invests in New Payphones", *Telephony,* Feb. 25, 1985, pp. 25–26.

Winspur, W. "A Design for File Management in a Computer Network" Computer Department for Health Sciences, Faculty of Medicine, University of Manitoba, 1975, pp. 126–128.

Wyatt, S. et al., "Telephone Decrementing Cards", *Focus Telephony,* Jul., 1981, pp. 38–39.

Zahlungsverkehr, E., "Kreditkarten Merken sich den Betrag", *Electronik/Nachrichtentechnik.*

Arden, Bruce "What can be automated?" The Computer science and Engineering research Study.*

Bagley, "Impacts of calling Card Service (CCS) Implementation" May/Jun. 1982.*

Hopper "European prepayment telephone card systems" Jan. 1984.*

Landis et al. "Apparatus for cashless telephoning" Jun. 24, 1981.*

Mearns et al. "Don't tell it—dial it" May/Jun. 1982.*

Notes on the BOC INTRA LATA networks.*

* cited by examiner

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–23 is confirmed.

* * * * *

(12) EX PARTE REEXAMINATION CERTIFICATE (5433rd)
United States Patent
Kamil

(10) Number: US 4,706,275 C2
(45) Certificate Issued: Jun. 27, 2006

(54) TELEPHONE SYSTEM

(75) Inventor: Zvi Kamil, Ramat Gan (IL)

(73) Assignee: Aerotel Ltd., Ramat Gan (IL)

Reexamination Request:
No. 90/006,517, Jan. 17, 2003
No. 90/007,099, Jun. 25, 2004

Reexamination Certificate for:
Patent No.: 4,706,275
Issued: Nov. 10, 1987
Appl. No.: 06/797,658
Filed: Nov. 13, 1985

Reexamination Certificate B1 4,706,275 issued Apr. 8, 2003

(30) Foreign Application Priority Data

Jan. 13, 1985 (IL) ................................................ 74048
Nov. 10, 1985 (IL) ................................................ 76993

(51) Int. Cl.
H04M 15/00 (2006.01)

(52) U.S. Cl. ............................... 379/114.2; 379/144.04; 379/144.17; 379/144.01; 379/154; 379/155

(58) Field of Classification Search ............ 379/114.01, 379/114.15, 114.17, 114.2, 114.03, 121.01, 379/115, 126, 91.01, 120, 144.04, 144.02, 379/146, 144.07, 114.19, 114.02, 114.16, 379/127.02, 115.01, 115.02, 144.01, 144.03, 379/145; 455/405, 406, 407, 408, 409
See application file for complete search history.

(56) References Cited

U.S. PATENT DOCUMENTS

| | | | |
|---|---|---|---|
| 3,022,381 A | 2/1962 | Pferd et al. | 179/6.4 |
| 3,087,018 A | 4/1963 | Pferd | 179/6.4 |
| 3,189,687 A | 6/1965 | Miller | 179/18 |
| 3,428,948 A | 2/1969 | Simjian | 340/147 |
| 3,564,210 A | 2/1971 | Presti | 235/61.7 |
| 3,571,799 A | 3/1971 | Coker, Jr. et al. | 340/152 |
| 3,652,795 A | 3/1972 | Wolf et al. | 179/2 DP |
| 3,676,597 A | 7/1972 | Peterson | 179/6.3 R |
| 3,769,463 A | 10/1973 | Graham et al. | 179/7.1 TP |
| 3,870,866 A | 3/1975 | Halpern | 235/61.6 R |
| 3,896,266 A | 7/1975 | Waterbury | 179/1 SB |
| 3,929,278 A | 12/1975 | Balavoine et al. | 235/61.8 R |
| 3,938,091 A | 2/1976 | Atalla et al. | 340/149 A |
| 3,985,998 A | 10/1976 | Crafton | 235/61.7 B |
| 4,028,494 A | 6/1977 | Zarouni | 179/6.3 R |
| 4,122,308 A | 10/1978 | Weinberger et al. | 179/7.1 R |
| 4,139,739 A | 2/1979 | von Meister et al. | 179/18 B |
| 4,146,746 A | 3/1979 | de Crepy et al. | 179/7.1 TP |
| 4,160,129 A | 7/1979 | Peyser et al. | 179/18 E |
| 4,162,377 A | 7/1979 | Mearns | |
| 4,182,934 A | 1/1980 | Keys et al. | 179/7 R |
| 4,191,860 A | 3/1980 | Weber | 179/18 B |
| 4,192,972 A | 3/1980 | Bertoglio et al. | 179/6.3 R |
| 4,204,113 A | 5/1980 | Giraud et al. | 235/375 |
| 4,224,472 A | 9/1980 | Zarount | 179/7.1 R |
| 4,232,199 A | 11/1980 | Boatwright et al. | 179/18 B |
| 4,256,955 A | 3/1981 | Giraud et al. | 235/380 |

(Continued)

FOREIGN PATENT DOCUMENTS

| | | |
|---|---|---|
| CA | 1 143 494 | 3/1983 |
| CA | 1 162 336 | 2/1984 |
| DE | 23 51 949 | 4/1975 |

(Continued)

OTHER PUBLICATIONS

Notice of Motion to Disqualify (with exhibits), dated Oct. 11, 2005 in *Aerotel v. IDT Corp. and Union Telecard*, Case No. 03 Civ. 6496 (RJH).

Memorandum of Law in Support of Defendants' Motion to Disqualify, dated Oct. 11, 2005 in *Aerotel v. IDT Corp. and Union Telecard*, Case No. 03 Civ. 6496 (RJH).

(Continued)

*Primary Examiner*—Rexford Barnie

(57) ABSTRACT

A telephone system enabling prepayment for telephone calls, wherein special code and credit information is stored in memory in special exchanges and debited as the call progresses.

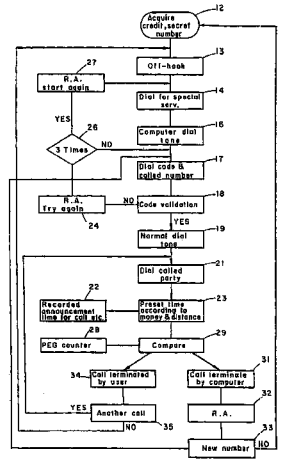

U.S. PATENT DOCUMENTS

| | | | |
|---|---|---|---|
| RE30,821 E | 12/1981 | Goldman | 340/825.54 |
| 4,326,123 A | 4/1982 | Hosterman | 235/380 |
| 4,332,985 A | 6/1982 | Samuel | |
| 4,367,402 A | 1/1983 | Giraud et al. | 235/380 |
| 4,410,765 A | 10/1983 | Hestad et al. | |
| 4,439,636 A | 3/1984 | Newkirk et al. | 179/7.1 R |
| 4,449,040 A | 5/1984 | Matsuoka et al. | 235/380 |
| 4,467,424 A | 8/1984 | Hedges et al. | 364/412 |
| 4,468,529 A | 8/1984 | Samuel et al. | |
| 4,501,958 A | 2/1985 | Glize et al. | 235/382 |
| 4,506,116 A | 3/1985 | Genest | 179/90 |
| 4,513,175 A | 4/1985 | Smith | |
| 4,517,412 A | 5/1985 | Newkirk et al. | 179/7.1 R |
| 4,518,824 A | 5/1985 | Mondardini | 179/6.3 CC |
| 4,559,415 A | 12/1985 | Bernard et al. | 179/2 DP |
| 4,577,061 A | 3/1986 | Katzeff et al. | 179/2 AM |
| 4,577,066 A | 3/1986 | Bimonte et al. | 379/60 |
| 4,580,011 A | 4/1986 | Glaser | 179/10 |
| 4,595,983 A | 6/1986 | Gehalo et al. | 364/401 |
| 4,611,096 A | 9/1986 | Asmuth et al. | 179/18 B |
| 4,616,852 A | 10/1986 | Cash | 282/27 R |
| 4,640,986 A | 2/1987 | Yotsutani et al. | 179/18 B |
| 4,669,730 A | 6/1987 | Small | 273/138 A |
| 4,673,802 A | 6/1987 | Ohmae et al. | 235/379 |
| 4,674,111 A | 6/1987 | Monet et al. | |
| 4,680,785 A | 7/1987 | Akiyama et al. | 379/57 |
| 4,685,127 A | 8/1987 | Miller et al. | 379/221 |
| 4,698,752 A | 10/1987 | Goldstein et al. | 364/200 |
| 4,707,592 A | 11/1987 | Ware | 235/379 |
| 4,759,056 A | 7/1988 | Akiyama | 379/197 |
| 4,768,222 A | 8/1988 | Kalfon | 379/91 |
| 4,768,223 A | 8/1988 | Kinoshita et al. | 379/143 |
| 4,782,519 A | 11/1988 | Patel et al. | 379/221 |
| 4,791,640 A | 12/1988 | Sand | 370/58 |
| 4,792,968 A | 12/1988 | Katz | 379/92 |
| 4,792,973 A | 12/1988 | Gilhousen et al. | 380/24 |
| 4,870,679 A | 9/1989 | Hanna et al. | 379/114 |
| 4,879,744 A | 11/1989 | Tasaki et al. | 379/144 |
| 4,897,870 A | 1/1990 | Golden | |
| 4,926,996 A | 5/1990 | Eglise et al. | 194/212 |
| 5,003,585 A | 3/1991 | Richer | 379/144 |
| 5,068,891 A | 11/1991 | Marshall | 379/91 |
| 5,153,906 A | 10/1992 | Akiyama | 379/112 |
| 5,251,252 A | 10/1993 | Katz | 379/92 |
| 5,359,645 A | 10/1994 | Katz | 379/93 |
| 5,790,636 A | 8/1998 | Marshall | 379/67 |
| 5,898,762 A | 4/1999 | Katz | 379/93.12 |

FOREIGN PATENT DOCUMENTS

| | | |
|---|---|---|
| DE | 23 03 423 | 7/1975 |
| DE | 29 03 450 | 8/1980 |
| DE | 29 03 479 | 8/1980 |
| DE | 34 06 615 | 8/1984 |
| DE | 34 01 319 | 7/1985 |
| EP | 0 009 684 | 4/1980 |
| EP | 0 015 120 | 9/1980 |
| EP | 0 041 261 | 12/1981 |
| EP | 0 048 868 | 4/1982 |
| EP | 0060643 | 9/1982 |
| EP | 0 066 823 | 12/1982 |
| EP | 0 088 639 | 9/1983 |
| EP | 0 152 198 B1 | 10/1991 |
| FR | 2 522 850 | 9/1983 |
| FR | 2 542 115 | 9/1984 |
| FR | 2 575 016 | 6/1986 |
| GB | 1 124 945 | 8/1968 |
| GB | 1 400 654 | 7/1975 |
| GB | 1 442 883 | 7/1976 |
| GB | 1 505 718 | 3/1978 |
| GB | 1 520 529 | 8/1978 |
| GB | 1 544 542 | 4/1979 |
| GB | 1544542 | 4/1979 |
| GB | 1 352 600 | 5/1979 |
| GB | 2046556 A | 11/1980 |
| GB | 2 057 740 | 4/1981 |
| GB | 2 065 353 | 6/1981 |
| GB | 2 141 309 | 6/1983 |
| GB | 2 118 341 | 10/1983 |
| GB | 2 120 507 | 11/1983 |
| GB | 2141309 A | 12/1984 |
| JP | 48-90110 | 11/1973 |
| JP | 52-16941 | 2/1977 |
| JP | 52-17740 | 2/1977 |
| JP | 52-21738 | 2/1977 |
| JP | 53-39808 | 4/1978 |
| JP | 53-115109 | 10/1978 |
| JP | 53-132919 | 11/1978 |
| JP | 54-95592 | 5/1979 |
| JP | 54-89509 | 7/1979 |
| JP | 55-107375 | 8/1980 |
| JP | 55-125738 | 9/1980 |
| JP | 55-166370 | 12/1980 |
| JP | 56-4969 | 1/1981 |
| JP | 56-20371 | 2/1981 |
| JP | 56-020371 | 2/1981 |
| JP | 56-072568 | 6/1981 |
| JP | 56-98966 | 8/1981 |
| JP | 57-24157 | 2/1982 |
| JP | 57-023358 | 2/1982 |
| JP | 57-73471 | 5/1982 |
| JP | 57-125567 | 8/1982 |
| JP | 57-125569 | 8/1982 |
| JP | 57-125570 | 8/1982 |
| JP | 57-127903 | 8/1982 |
| JP | 57-140062 | 8/1982 |
| JP | 58-003367 | 1/1983 |
| JP | 58-165473 | 9/1983 |
| JP | 58-221559 | 12/1983 |
| JP | 58-223952 | 12/1983 |
| JP | 59-16068 | 1/1984 |
| JP | 59-108446 | 6/1984 |
| JP | 59-190771 | 10/1984 |
| JP | 59-208973 | 11/1984 |
| JP | 60-10868 | 1/1985 |
| JP | 60-14563 | 1/1985 |
| JP | 60-35868 | 2/1985 |
| JP | 60-220655 | 11/1985 |
| JP | 61-006163 | 1/1986 |
| JP | 61-210754 | 9/1986 |
| JP | 2763082 | 10/1993 |
| JP | 5-284257 | 10/1993 |
| JP | 7-212504 | 8/1995 |
| WO | WO/81/01664 | 6/1981 |
| WO | WO 84/01073 | 3/1984 |
| WO | WO 87/02208 | 4/1987 |

OTHER PUBLICATIONS

Aerotel's Memorandum of Law in Opposition to Defendants' Motion to Disqualify (with exhibits), dated Oct. 24, 2005 in *Aerotel* v. *IDT Corp. and Union Telecard,* Case No. 03 Civ. 6496 (RJH).

Defendants' Amended Answer and Counterclaims (with exhibits), dated Oct. 25, 2005, in *Aerotel* v. *IDT Corp. and Union Telecard,* Case No. 03 Civ. 6496 (RJH).

Transcript, Deposition of John C. Donovan, Apr. 30, 2003.

Transcript, Deposition of John C. Donovan, May 9, 2003.

Transcript, Deposition of Jeffrey H. Ingerman, Mar. 28, 2003.

Aerotel's Reply to Defendant's Counterclaims, dated Dec. 15, 2005 in *Aerotel* v. *IDT Corp. and Union Telecard*, Case No. 03 Civ. 6496 (RJH).
Defendants' Reply in Further Support of Their Motion to Disqualify (with exhibits), dated Nov. 1, 2005 in *Aerotel* v. *IDT Corp. and Union Telecard*, Case No. 03 Civ. 6496 (RJH).
Letter dated Sep. 28, 2005 in *Aerotel* v. *IDT Corp. and Union Telecard* Case No. 03 Civ. 6496 (RJH).
Transcript, Deposition of Zvi Kamil, Apr. 1, 1997.
Transcript, Deposition of Zvi Kamil, Apr. 2, 1997.
Transcript, Deposition of Zvi Kamil, Jun. 16, 1998.
Transcript, Deposition of Zvi Kamil, Jun. 17, 1998.
Transcript, Deposition of Zvi Kamil, Dec. 14, 2000.
Transcript,. Deposition of Zvi Kamil, Apr. 8, 2003.
Unidentified Japanese Article.
An, Chungming et al, "Direct Dialing of Credit Card Calls," *Bell Telephone Laboratories*, pp. 44.1.1–44.1.5.
Adolphs, V.D., "Münzfernsprecher NT 2000 mit Mikrorechner*", *Feinwerktechnik—Messtechnik*, 1988.
Aisenberg, A. & Sorani, S., "A Distributed Control System for Public Telephones in Israel", p. 171.
Aldrich, N., "Choosing A Telecommunications Consultant", *Hospital Topics*, Mar./Apr. 1981, pp. 7–8.
American Telephone and Telegraph Company, "Noted on the BOC Intra–LATA Networks," 1983, p. 14.
"An active device for charge analysis and monitoring", *Telecommunications Journal*, Mar. 1983, p. 152.
An, C. et al."Helping the Stored Program Controlled Network Respond Quickly", *Bell Laboratories Record*, May/Jun. 1982, pp. 120–122.
Anderson, L. "French 'Smart Cards' Explained to American", *Telephony*, Apr. 19, 1982, pp. 9–10.
Antelman, Leonard, "Hart Industries Files Bankruptcy", *Electronic News*, Dec. 7, 1981.
Armstrong, S., "The 'smart card': revolution in the way you pay bills?", Sep. 13, 1983.
Arnold, P.A. "Card Operated Payphones Can Simplify Service and Security" *Telephony*, Sep. 1982, pp. 56–57.
"AT&T Card Caller Public Telephone 'A Significant Technical Advance,'" *AT&T Consumer Products Challenge*, No. 11, Dec. 19, 1983.
"Autelca", *Telecommunications Journal*, Sep. 1985.
Baggott, A.J., "Token Meters", *Telecommunicatoins Journal*, Apr., 1977, pp. 35–37.
Berenyl, I.,. "Telefax, Smart Phones Debut in Hungary, but Service Remains Limited", *Telephony*, Sep. 23, 1985, pp. 85–86.
Bertman, L.A., "Communications Are Integrally Related To Cost Containment, Employee Retention, and Increased Revenue", *Hospital Topics*, Jul./Aug. 1984.
Block, V., "FCC Rules Pay Phones Subject to Regulation", *In The Nation's Capital*, Jun. 3, 1985, pp. 16–18.
Borison, V. S. "TRANSACTION—Telephone Gets the Facts at the Point of Sale", *Bell Laboratories Record*, Oct., 1975, pp. 377–383.
Bowin, W.F., "Understanding the Paystation—types, control, terminology, improvements (all in simple English)", *Telephone Engineer & Management*, Jun. 15, 1972, pp. 54–60.
Brooks, A.P., "Operand Consistency Attendant: An Associative Solution to the Data Field Consistency Problem", *IBM Technical Disclosure Bulletin*, vol. 19 No. 1, Jun. 1976, pp. 222–224.

"Broward man charged in phone fraud" Nov. 24, 1981.
Caesperlein, Hermann, "Münzfunkfernsprecher bei der Deutschen Bundesbahn", 1980, pp. 551–554.
Cane, A., "The 'electronic chequebook' makes its debut", *Financial Times*, Aug. 9, 1983.
"Call up the future with Phonocard. Pre–paid card public telephone box", *Telecommunications Journal*, Aug. 1979.
Cariou, J. & Lardy, D. "The Freephone Service: A New Application for the E12 System", *Commutation and Transmission*, 1982, vol. 5, pp. 63–73.
Chen, D. et al., "Approximating the Performance of Two Phase Locking Using an Iteration Solution Model", *the University of Michigan Computing Research Laboratory Technical Report CRL–TR–25–84*, Apr. 1984, pp. 1–3.
"Coin–Operated Phones—Back To The Future", *TE&M*, Mar. 15, 1987, pp. 57–59, 61.
*Communication & Electronics*, Nov. 1970–Oct. 1971.
*Communication & Electronics*, vol. 6, No. 1, Nov. 1971.
*Communication & Electronics*, vol. 7, No. 1, Nov. 1972.
*Communication & Electronics*, vol. 8, No. 1, Nov. 1973.
*Communication & Electronics*, Nov. 1973–Oct. 1974.
*Communication & Electronics*, vol. 9, No. 11, Sep. 1975.
*Communication & Electronics*, May 1980–Apr. 1981.
*Communication & Electronics*, May 1981–Apr. 1983.
Corman, B., "Resale—A Case History." *Telephone Engineer & Management*, May 15, 1982.
Crabbe, E., et al., "DMTM: A Data Management and Transmission Module", *CTE Automatic Electric Journal*, 1983, pp. 51–56.
Curran, L., "Revisiting the Luddites", *BYTE Publications, Inc.*, vol. 9, No. 1, Jan., 1984, p. 4.
"Data Sheet", *Data Communications*, Oct. 20, 1982.
Demeautis, M. & Hummel, F. "The TV 2000 A Transactional Telephone".
Dickerson, B., "Bell Cuts WATS Service to Hart" (1981).
Dickerson, B., "Canadian Firm Could Get Hart Industries' Remaining Assets" 1982.
Dickerson, B., "Credibility the First Hurdle for Discount Phone Call Firm" *Communications*, Mar. 9, 1981.
Dickerson, B., "FCC Delay Snarls Long–Distance Phone Plan" 1980.
Dickerson, B., "State Orders Hart To Offer Full Refunds".
Dickerson, B., "Hart Delays Long Distance Service Again".
Dickerson, B., "Hart Gets Approval for Long–distance Calls", *The Miami Herald*, Apr. 29, 1981, p. 6D.
Dickerson, B., "Hart Industries' Lines Still Clogged" Jul. 15, 1981.
Dorros, I., "Reaching Into the Future with Stored Program Control", *Bell Laboratories Record*, Dec. 1980, pp. 387–393.
"Eighty Years of Public Telephones" NTT Business, vol. 32., No. 1, 1981, pp. 8–11.
*Eiektrisches Nachrichtenwesen*, Band 58, Nummer 1, 1983.
"Electronisches Geld" *Kommunikationstechnik*, Mar. 1985, pp. 39–41.
Eriksson, G., "Voice and Data Workstations and Services in the ISDN", *Ericsson Review*, 1984, pp. 14–19.
Estes, B. "Charge–A–Call Spreading Rapidly", *Telephone Engineer and Management*, Jan. 1, 1979, p. 89.
"Fernsprechapparate" *Elektriscnes Nasnachterwesen*, 1983, pp. 54–55 and 58–59.
"FCC Approves World's First Smart Card Telephone", Jul. 15, 1985.

Finneran, M.F., "Data Comm Focus", *Business Communications Review*, Nov./Dec. 1985, pp. 35–40.

"Fire Destroys Hart Industries", 1981.

"For every telephone *Monoprint* records the price, the hour, the date, the length, the number. And that's not all . . . ", *Telecommunications Journal*, Dec., 1979.

"France: Poised to Deliver the Backbone for the information age", *Data Communications*, Jun. 1983.

Freeman, P., *Software System Principles*, 1975, p. 137.

"French EFT Program Enters its Final Phase", *Data Communications*, Jun. 1983.

Fritz, M.S. & Talley, J., "Bloomington Hospital's Experience With Lifeline", *Hospital Topic*, Sep./Oct. 1982, pp. 14–18.

"The French Smart Card Finally Arrives in the U.S.", *Data Communications*, Nov. 1984, pp. 263–265.

Gibson, G.T., "A Fleeting Market for AT&T's Resellers," *Venture*, Oct. 1982, pp. 62, 64–65.

Grizzle, J.W., & Marcus, S.I., "A Decentralized Control Strategy For Multiaccess Broadcast Networks", pp. 75–88, (1982).

Grunig. R., "Halser Mailmaster F 204 Franking Machine", Hasler Review, vol. 11, No. 1, 1978.

Gunn, H., "Efficiency and Savings Boosted by BVA and BNS Techniques," *Telephony*, Feb. 21, 1983, pp. 114, 116.

Haggerty, M., "Firms Sell Varying Ways To Save", Aug. 8, 1981.

Haggerty, M., "Talk is Cheaper Long-distance callers have alternatives to Bell" *Money*, Aug. 8, 1982.

Harrop, P., "New Electronics for Payment", 1982, pp. 339–342.

"Hart Industries settles", Jul. 28, 1981.

"The History of the Payphone", http://www.kitecom.co.uk/phone/histor1.html.

Harvey, D., "This BOSS Works for Residence Customers", *Bell Laboratories Record*, Mar. 1980, pp. 81–86.

Higashiyama, F. & Murata, M., "Credit Call Service", *Engineering Bureau NTT*, pp. 308–309.

Hopper, C., "European Prepayment Telephone Card Systems," *Communications International*, vol. 11, No. 1, Jan. 1984, pp. 76–80.

Hughes, L.A., "New Phone Service Faces First–Day Problems", *The Miami Herald*, Jul. 8, 1981.

Hughes, L.A., "Hart Users Still Hear Busy Signals", *The Miami Herald*.

"IC Cards Are On The Way", *TE&M*, May 15, 1987, pp. 71, 74–75.

*IEEE*, Apr. 22–Apr. 24, 1975.

*IEEE*, Oct. 10–13, 1977.

*IEEE*, Oct. 23–25, 1979.

*IEEE*, May 24–28, 1981.

JP. Ref No. 12.

Kamil, Z., "Procédé pour effectuer des appels téléphoniques et systéme téléphonique", Nov. 10, 1985.

KDD Technical Journal, Oct. 1978, No. 98.

Komatsu, Hiroyuki, "Station Message Detailed Accounting System KX–400", *Iwatsu Gino*, vol. 21., No. 1. 1982.

Korth, Henry F., "Locking Primitives in a Database System", J.ACM 30, 1(Jan. 1983), pp. 55–79).

Kutler, J., "Experts Discussing Future of Smart Card Wonder When Their Chip Will Come In", *BACK PAGE*.

Lannon, J.F., "How To Save Money and Increase Our Telecommunications Capabilities", *Hospital Topics*, Sep/Oct. 1982, pp. 30–34.

Lawser, J.J., & Sheinbein, D., "Realizing the Potential of the Stored Program Controlled Network", *Bell Laboratories Record*, Mar. 1979, pp. 85–89.

Ledger, V. W., "US Vanguard Visits France To Look at the Smart Card", *American Banker*, Aug. 11, 1982.

Lessien, "Smart Card Technology and How It Can Be Used", *American Banker*, May 20, 1982.

Lipman, A.D., "Computer II and Coinless Pay Phones", *Telephony*, Sep. 16, 1985, pp. 53–57.

Lissandrello, G.,J., "Future's Bright For Smart Cards" *Telephone Engineer & Management*, Nov. 1, 1985.

"Long–distance refunds sought".

Lucking, K.F.C. "Card Operated Pre–Payment Metering".

"MAKATEL, das Authorisierungstelefon im Geschäftsverkehr mit Kreditkarden".

Matsui, H. et al., "A Multi–Functional Telephone with Memory Cards Which Expand Talking Services" *Consumer Electronics*, vol. 34 No. 3, Aug. 1988, pp. 749–758.

Meadow, C. T., *Applied Data Management*, 1976, p. 147.

Mearns, A., et al., "Don't Tell It—Dial It", *Bell Laboratories Record*, May/Jun. 1982, pp. 117–119.

Meier, A.R., "Major Real Estate Developers Building Huge New Telephone Resale and Tenant Services Industry", *Business Communications Reveiw*, pp. 21–22.

Merzer, M., "Cut–rate Long Distance Calls Replace AT&T's Monopoly", *Communications*, p. 6.

"Microcomputers for the Telephone", *Telecommunications Journal*, Mar. 1983. pp. 151–152.

Mier, E. E., "Inside the Smart Card", *Data Commuications*, Jun. 1982.

Mills, M., "Memory Cards: a New Concept in Personal Computing", *BYTE Publications Inc.*, Jan. 1984, pp. 154, 156, 159–160, 162, 164, 166, 168.

Moshavi, S., "Please Deposit No Cents", *Forbes*, Aug. 16, 1993, p. 102.

Moskoff, George R., "Options for Call Accounting", *Business Communications Review*, Mar.–Apr. 1985.

"Multimil Introduces Credit Cardsized Computer and Related Communications Products to Industry Leaders During Dallas Launch" May 1, 1985.

Nather, V.P., "Prüfung von Digitalen Bausteinen und Leiterplatten Schwerpunkt: LSI", *Feinwerktechnik—Messtechnik*, 1980.

National Applied Computer Technologies,"ATS III/65 Automated Long Distance Telephone Service User's Guide," Version 1.5, Jul. 1983.

National Applied Computer Technologies, "ATS III/65 Automated Long Distance Telephone Service User's Guide," Version 2.0, Oct. 1983.

"National Pay Telephone Answers The Call For Credit–Card Phones", *Business Week*, Dec. 17, 1984, p. 112.

"Newsfront", *Data Communications*, Jan. 1984.

"Phonecard. A Solid Investment", *Telecommunications Journal*, Aug. 1985.

"Phonotaxe BTE60. Sodeco simplifies the coin telephone", *Telecommunications Journal*, Sep. 1985.

"PR Newswire", Jul. 15, 1985.

"Public Telephone" pp. 17–22.

"Public Telephony/Exchange Systems", http://wwww.ur-net.it/ertt2.htm, 1996.

"Remote Management by Soderco. A New Form of Intelligence.", *Telecommunications Journal*, Oct. 1985, p. a34.

Salant, J.D., "Firm Gives Alternative to Ma Bell".

Sinopoli, J., "Adapting RFP's for Shared Tenant Services", *Business Communications Review*, May–Jun. 1985, pp. 7–10.

"Simple call meters or electronic control units, our systems meet everyone's requirements: from private subscribers to telecommunications administrations", *Telecommunications Journal*, Nov. 1979.

Sheets, L.L., "Signaling Systems" pp. 165–174.

Smart, T., "Hart Accused of Giving 'Pathetic' Telephone Service", Oct. 10, 1981.

"A Smart Card Combine on the Verge of a Standard", *Data Communications*, Apr. 1984.

"Smart Cards Ready for Major Push in France", *Data Communications*, Sep. 1985.

"State–of–the–art technologies for the metering and handling of telephone charges", *Telecommunications Journal*, Jun. 1983, pp. a33.

Svigals, J., "Low Cost Point–of–Sale Terminal" *IBM Technical Disclosure Bulletin*, vol. 25 No. 4, Sep. 1982, pp. 1835.

"A Switch in the Resale Direction," *Telephone Engineer & Management*, Mar. 15, 1983, pp. 64–66.

*Telephone Engineer & Management*, Oct. 1, 1984.

"Telephone Management System User Manual," Version 1.0,Oct. 23, 1981.

"Telephone Products Win Federal Approval", American Banker, Aug. 7, 1985.

Toth, V.J., et al., "Does Resale Have an Identity Crisis?"*Telephone Engineeer & Management*, Mar. 15, 1983, pp. 147–148, 150.

"Toward a More Automated Network TSPS Enhancements Lead the Way", Feb. 8, 1982.

Turbat, A., "Telepayment and Electronic Money—The Smart Card."

"US Banks Prodded on Smart Card", *American Banker*, Feb. 7, 1983, pp. 3 and 10.

"US Sprint Greets Second Year With Operator Service, Foncard", *Telephony*, Jul. 6, 1987.

Young, E., "Competition Rings A Bell", May 26, 1981.

Wainwright, R., "Subscriber Electronics", pp. 56–57.

"We are the specialists for telephone call charge meters", *Telecommunications Journal*, Apr. 1977, p. a33.

Weinstein, S.B., "Smart Credit Cards: The Answer to Cashless Shopping," *IEEE Spectrum*, Feb. 1984, pp. 43–49.

Weinstein, S. B., "Emerging Telecommunications Needs of the Card Industry", *IEEE Communications Magazine*, vol. 22 No. 7, Jul., 1984, pp. 26–31.

White, J.A., "Western Union Buys 50% AirFone Stake, Airlines Sign for In–Flight Phone Service," *The Wall Street Journal*, Dec. 17, 1981, p. 52.

Wiblé, P.A., "Le Téléphone à Carte: Un Nouveau Service," *La Revue Polytechnique*, No. 1402, pp. 1171–1175.

Wible, V.P., "Bargeldloses Telephonieren mit PHONO-CARD", *Janrgang*, 1990.

Williamson, J., "British Telecom Invests in New Payphones", *Telephony*, Feb. 25, 1985, pp. 25–26.

Winspur, W. "A Design for File Management in a Computer Network" Computer Department for Health Sciences, Faculty of Medicine, University of Manitoba, 1975, pp. 126–128.

Wyatt, S. et al., "Telephone Decrementing Cards", *Focus Telephony*, Jul., 1981, pp. 38–39.

Yoshizawa, K., et al., "Voice Response System for Telephone Betting," *Hitachi Review*, vol. 26, No. 6 (1977), pp. 215–220.

Zahlungsverkehr, E., "Kreditkarten Merken sich den Betrag", *Electronik/Nachrichtentechnik*.

Bob Stoffels, "Resale—an Overview," *Telephone Engineer & Management*, May 1, 1982, pp. 67–69.

Frank D. Reese, "Reseller Analyses Equipment Options," *Telephone Engineer Management*, Jun. 1, 1983.

John Bagley, "Impacts of Calling Card Service (CSS) Implementation," *GTE Automatic Electric Journal*, May–Jun. 1982, pp. 99–108.

Bruce W. Arden, ed., *What Can be Automated?: The Computer Science and Engineering Research Study (COSERS)*, MIT Press, 1980, pp. 762–764.

R. G. Basinger, et al., "Calling Card Service—Overall Description and Operational Characteristics," *The Bell System Technical Journal*, Sep. 1982, pp. 1655–1673.

J. R. Lewin "Payphones in the Nineteen–Eighties," *British Telecommunications Engineering*, Apr. 1982, pp. 2–9.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–23 is confirmed.

* * * * *